United States Patent
Waugh

(10) Patent No.: US 8,996,930 B2
(45) Date of Patent: Mar. 31, 2015

(54) ERROR VIDEO CREATION, PLAYBACK AND REPORTING

(75) Inventor: Timothy Mark Waugh, Bournemouth (GB)

(73) Assignee: Red Hat, Inc., Raleigh, NC (US)

( * ) Notice: Subject to any disclaimer, the term of this patent is extended or adjusted under 35 U.S.C. 154(b) by 212 days.

(21) Appl. No.: 12/912,601

(22) Filed: Oct. 26, 2010

(65) Prior Publication Data

US 2012/0102373 A1    Apr. 26, 2012

(51) Int. Cl.
  *G06F 11/00* (2006.01)
  *G06F 11/07* (2006.01)
(52) U.S. Cl.
  CPC ........ *G06F 11/0778* (2013.01); *G06F 11/0769* (2013.01)
  USPC ................................. 714/57; 714/25; 714/48
(58) Field of Classification Search
  CPC .................................................. G06F 21/6245
  USPC ...................................................... 714/57, 46
  See application file for complete search history.

(56) References Cited

U.S. PATENT DOCUMENTS

| 6,631,482 | B1 * | 10/2003 | Marks ............................. 714/45 |
| 2005/0055673 | A1 * | 3/2005 | Dias et al. ...................... 717/127 |
| 2008/0141221 | A1 * | 6/2008 | Benesovska et al. ......... 717/124 |
| 2008/0208755 | A1 * | 8/2008 | Malcolm ......................... 705/59 |
| 2008/0301101 | A1 * | 12/2008 | Baratto et al. ..................... 707/3 |
| 2009/0144619 | A1 * | 6/2009 | Best et al. ...................... 715/277 |

* cited by examiner

Primary Examiner — Sarai Butler
(74) Attorney, Agent, or Firm — Lowenstein Sandler LLP

(57) ABSTRACT

A computer system records screenshots associated with a user session. In response to an error in a user application that has occurred during the user session, the computer system terminates the recording and creates a video file from the recorded screenshots. While notifying the user about the error, the computer system allows the user to select an option to play back the created video. In response to a user selection, the computer system plays back the video from a local store.

16 Claims, 6 Drawing Sheets

ERROR VIDEO CREATION, PLAYBACK AND REPORTING

TECHNICAL FIELD

Embodiments of the present invention relate generally to error reporting in software applications, and more specifically to error video creation, playback, and reporting.

BACKGROUND

One of the primary concerns of software developers is identifying the cause of errors that cause software applications to crash unexpectedly. In order to effectively do this, it is important to know what interaction a user had with the application before the error occurred. In some current solutions, when a software application experiences an error, an error report is generated to send to the software developer. As part of the report, the user may be asked to write down what they have done and what buttons they clicked before the error occurred to help the software developer to reproduce the error. Unfortunately, the user may not remember exactly what they were doing and what applications they were interacting with at the time of the error.

BRIEF DESCRIPTION OF THE DRAWINGS

Embodiments of the present invention are illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of a method and system for error video creation, playback and recording are described herein. In one embodiment, a computer system records screenshots associated with a user session. In response to an error in a user application that has occurred during the user session, the computer system terminates the recording and creates a video file from the recorded screenshots. While notifying the user about the error, the computer system allows the user to select an option to play back the created video, and in response to a user selection, plays back the video from a local store. In some embodiments of the present invention, the computer system sends the created video to a third party.

With embodiments of the present invention, a user can easily remember what steps they took that may have caused an error in a user application by viewing a created video of the moments leading up to the error. The user can also forward the created video to a third party (e.g., a software developer) to assist in error analysis.

Figure 1:
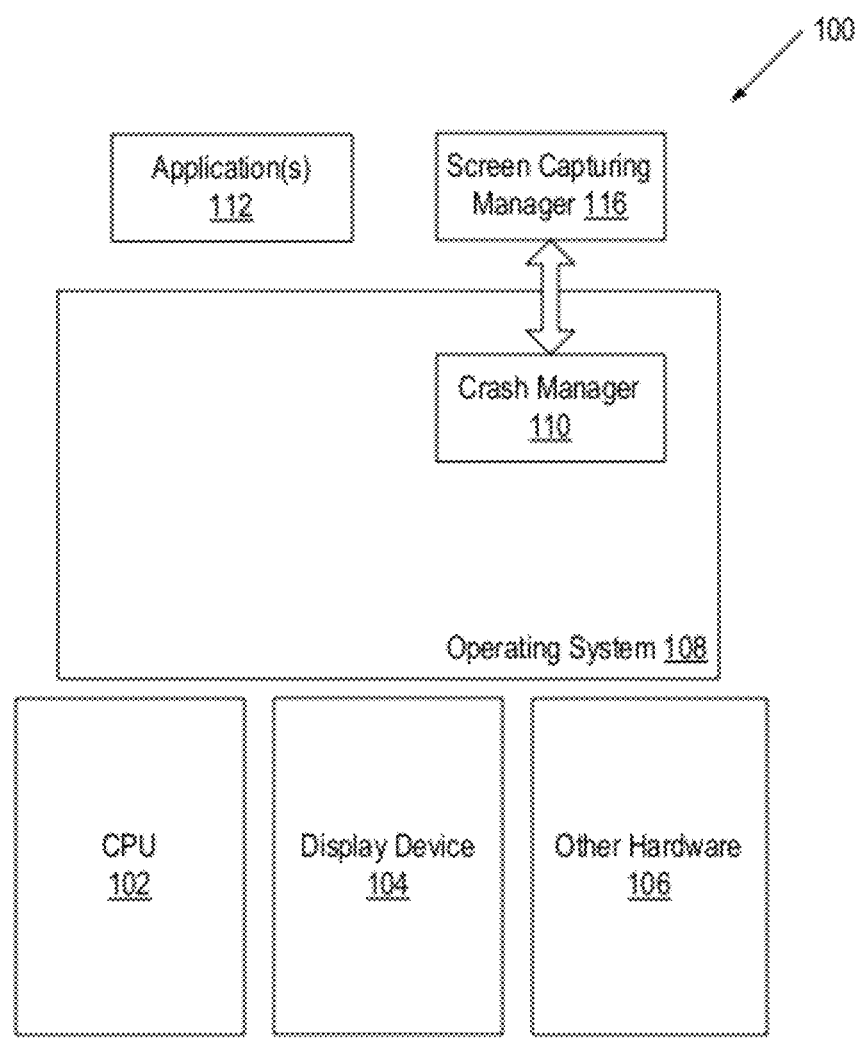
FIG. 1 illustrates an exemplary computer system architecture in which embodiments of the invention may operate.

FIG. 1 illustrates an exemplary computer system architecture 100 in which embodiments of the invention may operate. The computer system 100 includes a processor (CPU) 102, a display device 104, and other hardware 106.

CPU 102 can be any type of processor capable of executing software, such as a microprocessor, digital signal processor, microcontroller, or the like. Display device 104 can be any display device (e.g., a liquid crystal display (LCD) or a cathode ray tube (CRT)) for displaying output. Other hardware 108 may include a pointer device, a keyboard, etc. An exemplary computer system is described in more detail below in conjunction with FIG. 5.

Computer system 100 also includes an operating system 108 that hosts one or more user applications 112 and a screen capturing manager 116. The operating system 108 also hosts a crash manager 110 that may be part of the operating system 108 or run on top of the operating system 108. Operating system 108 may be, for example, a Windows® operating system, a Linux® operating system, etc. Applications 112 can represent one or more applications of any type including, for example, a browser application, a web application, a desktop application, etc.

Crash manager 110 may monitor one or more of the user applications 112 that are executing as part of a user session. If one of the monitored applications experiences an error that causes the application to terminate unexpectedly (e.g, crash), crash manager 110 may detect that an error has occurred and that the application has crashed and present an error report to a user, as well as allowing the user to forward the error report to a third party (e.g., a software developer or other entity working on fixing bugs in software applications) for analysis.

Screen capturing manager 116 may record screenshots associated with a user session. A screenshot is an image of a graphical representation of a user desktop at a given point in time. In one embodiment, after detecting that an error has occurred, crash manager 110 may communicate with screen capturing manager 116 to alert screen capturing manager 116 to terminate recording. Screen capturing manager 116 may create a video from the recorded screenshots and crash manager 110 may present the user with an option to play back the created video as part of the error report. Crash manager 110 may also send the created video to a third party. In some embodiments, the created video is sent along with the error report.

Figure 2A:
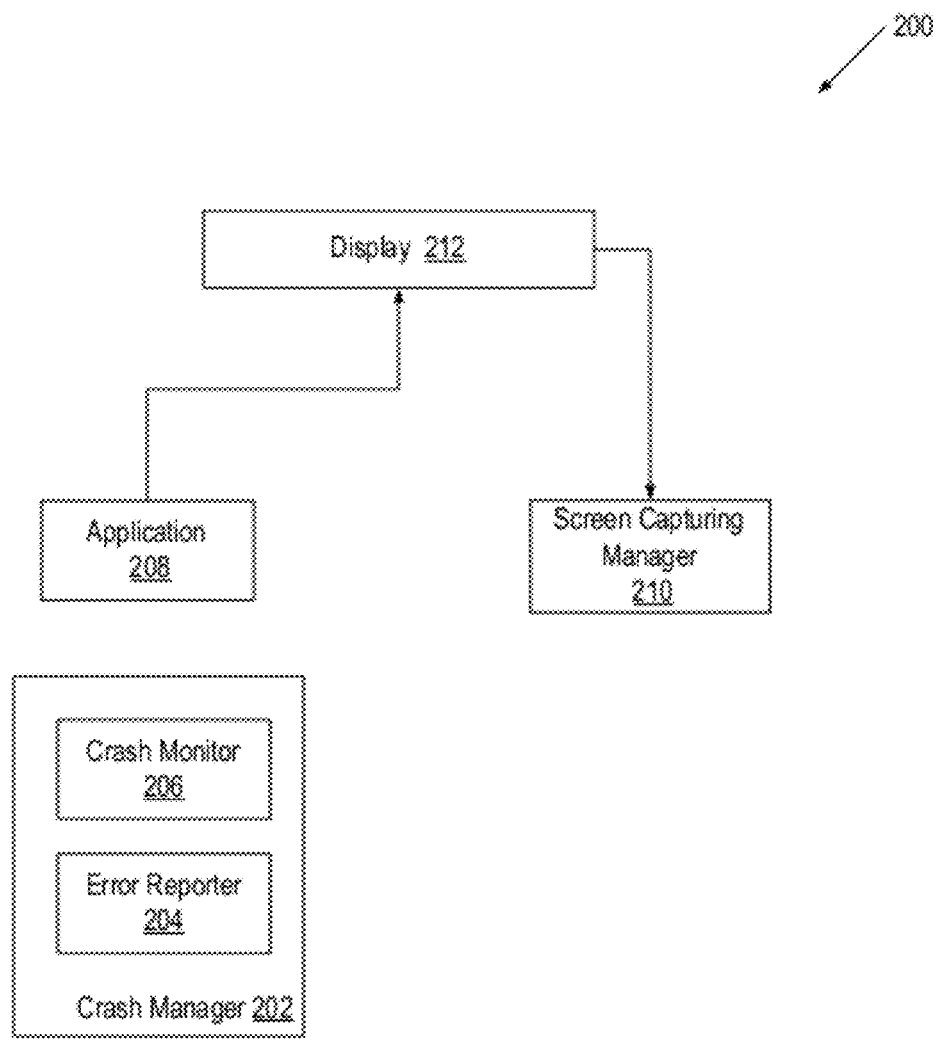
FIGS. 2A and 2B illustrate the operation of error video creation, playback, and reporting according to some embodiments of the invention.
Figure 2B:
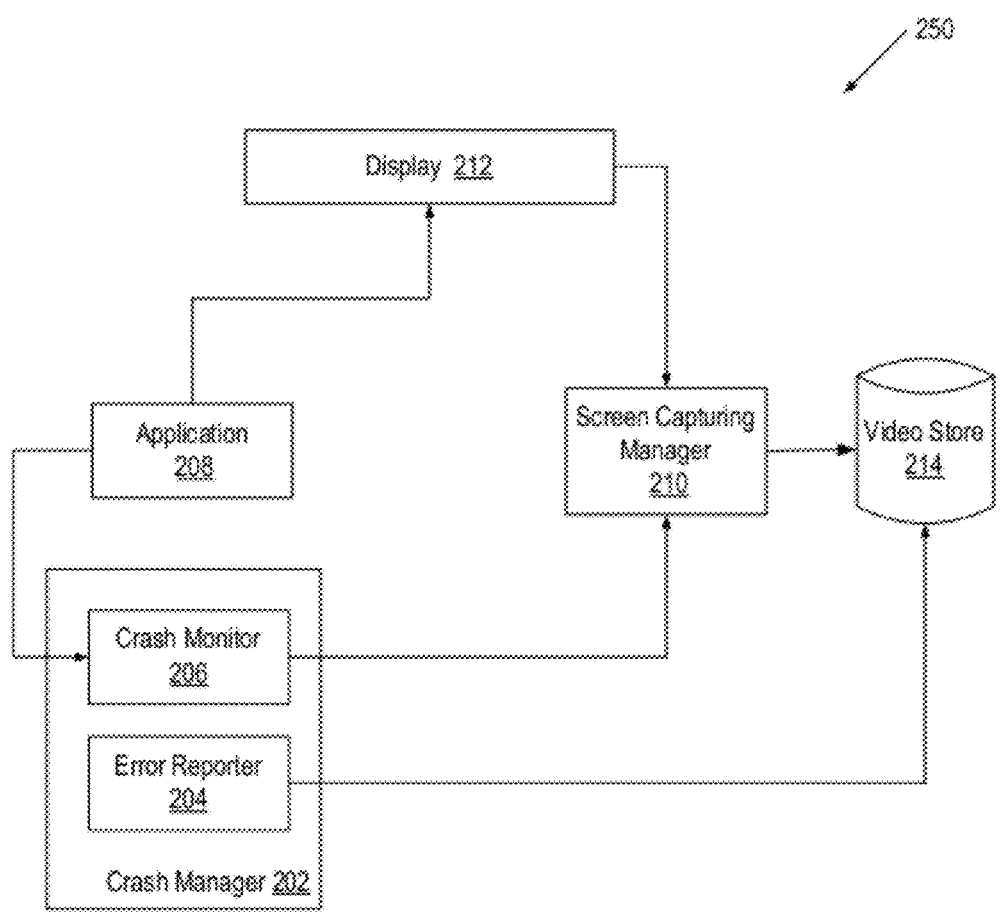

FIGS. 2A and 2B illustrate the operation of error video creation, playback, and reporting according to some embodiments of the present invention. In FIG. 2A, crash manager 202 includes crash monitor 206 that monitors applications executing in a user space for errors and error reporter 204 that reports errors to a user and, in some embodiments, to third parties. Crash manager 202 will be described in more detail below in conjunction with FIG. 2B.

Application 208 and screen capturing manager 210 execute in a user space. Application 208 may be one of multiple user applications associated with a user session that are currently executing in the user space. In one embodiment, when the application 208 is operating normally (e.g., without experiencing an error), it provides output (e.g., a graphical user interface (GUI)) to a display 212. Display 212 may be any display device that displays data during the execution of application 208.

Screen capturing manager 210 may record screenshots of the display 212 during the user session. In one embodiment, the screen capturing manager 210 begins recording screenshots of the display 212 when the user session is initiated. The recording of screenshots by screen capturing manager 210 may be configurable in order to minimize the consumption of system resources by screen capturing manager 210. In some embodiments, the configuration may be done by a user of screen capturing manager 210. Alternatively, screen capturing manager 210 may adjust recording automatically based on available system resources.

In one embodiment, screen capturing manager 210 may be configured to record screenshots of the display 212 only if the user session has not gone idle. Screen capturing manager 210 may also be able to record at a reduced frame rate (e.g., to optimize consumption of resources, the time between screenshots may be increased or decreased either automatically or based on user preference). Screen capturing manager 210 may also be able to record at varying resolutions (e.g., in some circumstances, it may be optimal to record only every other pixel of display 212).

In one embodiment, screen capturing manager may record screenshots of the entire user desktop as shown on display 212. Alternatively, screen capturing manager 210 may be configured to only record the active (e.g., currently focused on by the user) window. The active window may be the window that was last selected with a pointer device, the window currently under a mouse pointer, etc.

In some embodiments, because only the last few seconds before an error are required to ascertain what steps a user has taken to cause the error, screen capturing manager 210 may store screenshots in memory (e.g., a buffer in Random Access Memory (RAM)) and automatically discard any screenshots taken more than a specified window of time ago (e.g., any screenshots older than 2 seconds may be automatically discarded). In one embodiment, this window of time may be user configurable. Alternatively, this window of time may be predefined programmatically.

Referring to FIG. 2B, when application 208 experiences an error that causes it to stop executing unexpectedly (e.g., a crash or exception), crash monitor 206 becomes aware of the crash and instructs screen capturing manager 210 to terminate its recording. In one embodiment, application 208 includes a signal handler that catches signals which would otherwise cause application 208 to abort, and notifies crash monitor 206 about such an event. In response, crash monitor 206, which may run as a system daemon, examines the application process to obtain a stack trace that may be later used for reporting by error reporter 204.

Upon receiving the recording termination instructions from crash monitor 206, screen capturing manager 210 terminates the recording and creates a video from the recorded screenshots. In some embodiments, if the screen capturing manager 210 is configured to discard screenshots that are older than a specified window of time, screen capturing manager 210 uses all non-discarded recorded screenshots in the video. Alternatively, a desired length of video may be specified, and screenshots recorded within the desired time may be used, and the rest discarded.

In order to create the video, screen capturing manager 210 may combine the recorded screen shots and compress them into a movie file format (e.g., Ogg Theora, Windows Media Video, etc.). Screen capturing manager 210 may store the created video in a local video store 214. The video store 214 may be a file, a database, a repository, or any other data structure(s) residing on one or more electronic devices, such as main memory, or on one or more mass storage devices, such as magnetic or optical storage based disks, tapes or hard drives.

Error reporter 204 may create an error report and present it to the user for review. In one embodiment, the error report may contain information (e.g., a stack trace) collected from the application 208. The error report may be a user interface generated by error reporter 204 and presented to the user. The user may be given the opportunity to remove sensitive information (e.g., passwords) from the information collected from the application. The report may also contain an area for a user to include comments and to inform a third party what steps to take to reproduce the error. The report may also include an option for the user to play back the video of the moments leading up to the error created by screen capturing manager 210. If the user selects the option, error reporter 204 may access the created video in the video store 214 and play it back for the user. Error reporter 204 may also allow the user the option to forward the created error report to a third party for analysis. In one embodiment, the user is able to include the created video along with the error report when sending it to the third party. Error reporter 204 may send the error report to the third party via a public network (e.g., the Internet) or via a private network (e.g., a Local Area Network (LAN)). An exemplary user interface generated by error reporter 204 in accordance with some embodiments of the invention is displayed in FIG. 4.

Figure 3:
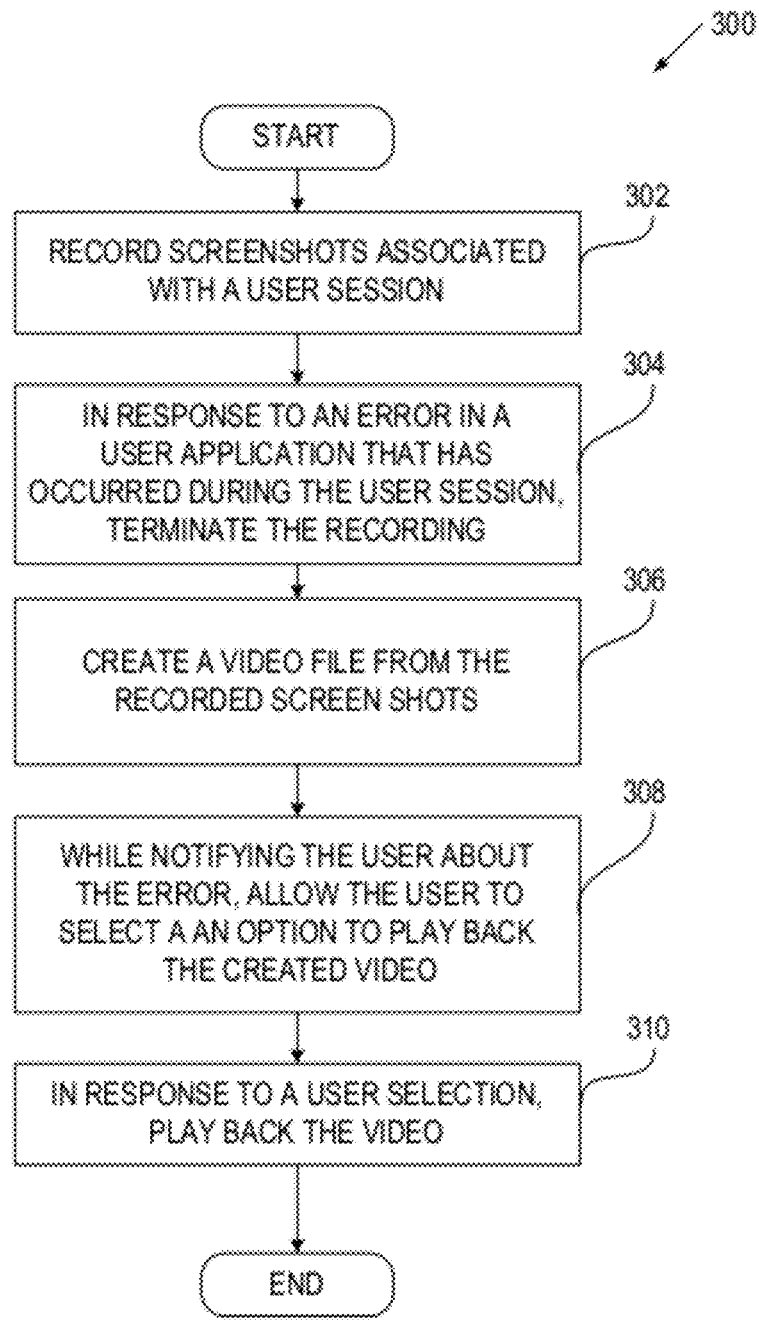
FIG. 3 is a flow diagram of one embodiment of a method for error video creation, playback and reporting.

FIG. 3 is a flow diagram of one embodiment of a method 300 for error video creation, playback, and reporting. The method 300 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a computer system (e.g., computer system 100 of FIG. 1).

Referring to FIG. 3, processing logic records screenshots associated with a user session at block 302. In one embodiment, processing logic begins recording screenshots when a user initiates the user session. Processing logic may delete previously recorded screenshots that are older than a specified window of time. In some embodiments, processing logic may record screenshots of the entire user desktop. Alternatively, processing logic may record screenshots of only part of the user desktop (e.g., recording only the active window). In some embodiments, processing logic records screenshots at a reduced frame rate, at a lower resolution, and/or only when the user session is not idle if necessary to minimize the use of system resources.

In response to an error in a user application that has occurred during the user session, processing logic terminates the recording at block 304. An error may be associated with an abnormal termination of the user application or with unintended behavior of the user application.

At block 306, processing logic creates a video file from the recorded screen shots. Processing logic may create the video file by combining the recorded screen shots and then encoding or compressing them into a video file format. Processing logic may store the created video file in a local store for later retrieval and play back.

While notifying the user about the error, processing logic allows the user to select an option to play back the created video at block 308. Processing logic may create an error report and present it to the user to notify the user about the error. The error report may include information about the error and allow the user to play back the created video file.

In response to a user selection, processing logic plays back the video at block 310. If the user elects to play back the video, processing logic may retrieve the video from a local store and play back the video for the user. Based on the video, the user may be able to determine what caused an error in the user application even if the user has no technical knowledge in programming. Processing logic may also allow the user to forward the report and/or the created video file to a third party (such as a software developer or system administrator) for error analysis.

Figure 4:
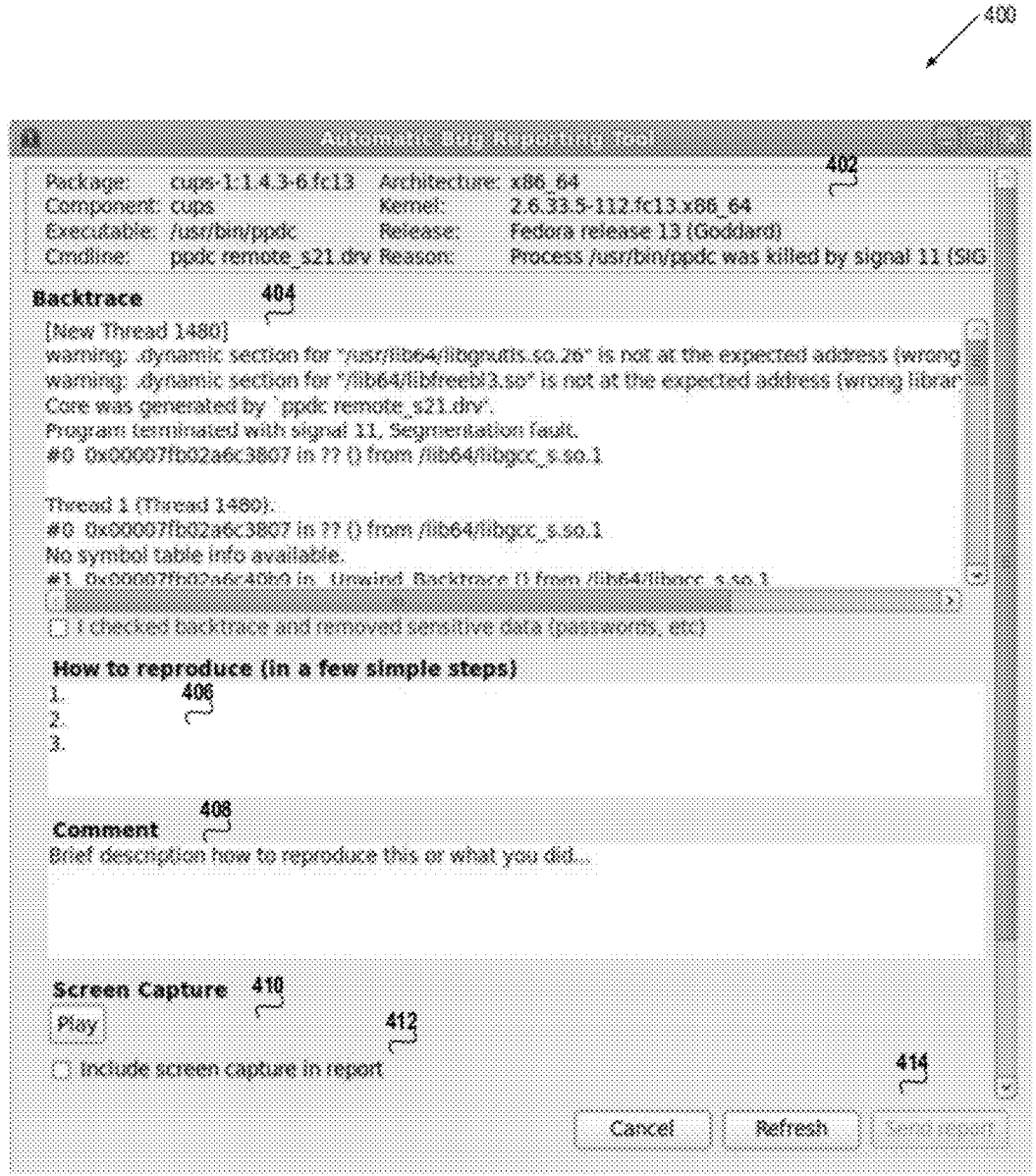
FIG. 4 is an exemplary error report according to some embodiments of the invention

FIG. 4 is an exemplary error report 400 according to some embodiments of the present invention. In one embodiment, the error report 400 is created by crash manager 110 of FIG. 1. The error report 400 may be presented to the user after an error has caused an application to terminate unexpectedly.

Error report 400 contains information about the computer system, the application (or process) that unexpectedly terminated, and the given reason for the termination at node 402. Error report 400 also contains a backtrace 404 that contains information from the terminated application from the time the error occurred.

Error report 400 also asks the user to provide information regarding how to reproduce the error in the future at node 406, as well as any comments about the user's interactions that could have lead to the error at node 408. To assist the user with remembering this information, error report also offers to play back a screen capture of the moments leading up to the error for the user at node 410.

Error report 400 also includes an option 412 for the user to include the screen capture video in the report at node. Upon confirming that the report contains no sensitive data, the user will be given the option to send the report (along with the screen capture video if the user selects the option) to a third party for analysis at node 414.

Figure 5:
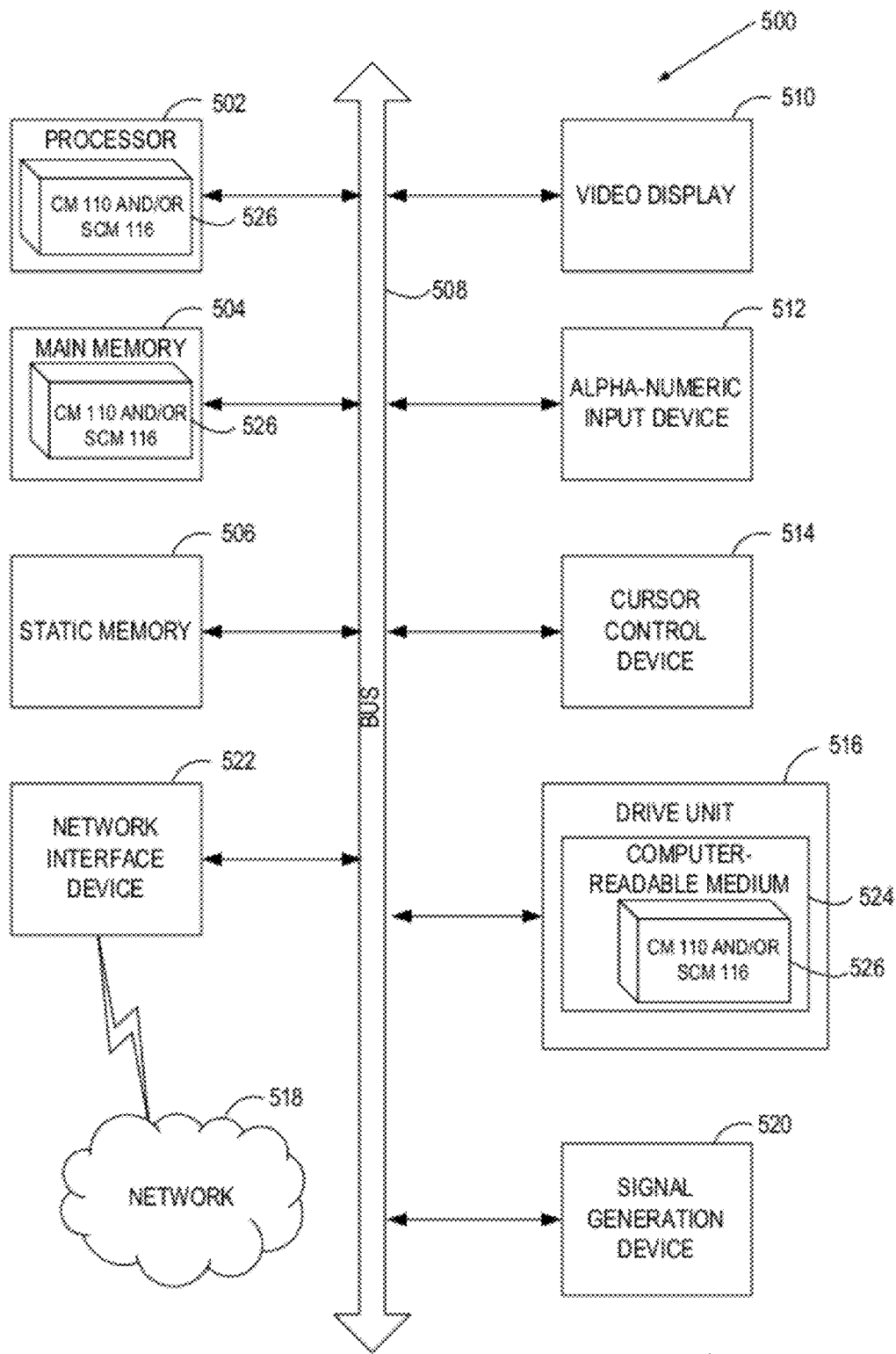
FIG. 5 is a block diagram of one embodiment of a system for error video creation, playback, and reporting.

FIG. 5 is a block diagram of one embodiment of a computer system 500 for error video creation, playback, and reporting. Within the computer system 500 is a set of instructions for causing the computer system 500 to perform any one or more of the methodologies for error video creation, playback, and reporting. In alternative embodiments, the computer system 500 may be connected (e.g., networked) to other machines in a LAN, an intranet, an extranet, or the Internet. The computer system 500 can operate in the capacity of a server machine or a client machine in a client-server network environment, or as a peer machine in a peer-to-peer (or distributed) network environment. The computer system 500 may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies for error video creation, playback, and reporting discussed herein.

The exemplary computer system 500 includes one or more processing devices 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device in the form of a drive unit, which may include fixed or removable computer-readable storage medium), which communicate with each other via a bus 508.

Processing devices 502 represent one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute instructions of crash manager (CM) 110 and/or screen capturing manager (SCM) 116 for performing the operations and steps for error video creation, playback, and reporting discussed herein.

The computer system 500 may further include a network device 522 (e.g., NIC, Ethernet network card, etc.). The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 516 may include a drive unit having a machine-readable storage medium (or more specifically a computer-readable storage medium) 524 on which is stored one or more sets of instructions of crash manager (CM) 110 and/or screen capturing manager (SCM) 116 embodying any one or more of the methodologies or functions for error video creation, playback, and reporting described herein. The instructions of the crash manager (CM) 110 and/or screen capturing manager (SCM) 116 may also reside, completely or at least partially, within the main memory 504 and/or within the processing device 502 during execution thereof by the computer system 500, the main memory 504 and the processing device 502 also constituting machine-readable storage media. The instructions of the crash manager (CM) 110 and/or screen capturing manager (SCM) 116 may further be transmitted or received over a network 518 via the network device 522.

The computer-readable storage medium 524 may also be used to store the instructions of the crash manager (CM) 110 and/or screen capturing manager (SCM) 116 persistently. While the computer-readable storage medium 526 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The components and other features for error video creation, playback, and reporting described herein (for example in relation to FIG. 1) can be implemented as discrete hardware components or integrated in the functionality of hardware components such as ASICS, FPGAs, DSPs or similar devices. In addition, these components can be implemented as firmware or functional circuitry within hardware devices. Further, these components can be implemented in any combination of hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "recording," "terminating," "creating," "allowing," "playing" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations for error video creation, playback, and reporting described herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for error video creation, playback, and reporting with multiple processors has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a client computer system, comprising:
    recording, by a processing device of the client computer system, screenshots associated with a user session;
    removing, by the client computer system, sensitive data from the recorded screenshots;
    in response to an error in a user application that has occurred during the user session, terminating the recording;
    creating, by the client computer system, a video from the recorded screen shots with removed sensitive data, and storing the created video in a local store;
    presenting, on a screen of the client computer system, a user interface (UI) comprising information about the error, the UI further comprising a UI control element facilitating a user selection of an option to play back the created video, and a UI element facilitating a user confirmation that the information about the error does not include the sensitive data;
    in response to a selection of the option to play back the created video by the user via the UI control element, playing back, by the client computer system, the created video from the local store; and
    upon receiving the user confirmation that the information about the error does not include the sensitive data, generating an error report comprising the information about the error, and sending the error report and the created video to a third party for analysis.

2. The method of claim 1, wherein:
    the UI further comprises a UI element facilitating a user selection of an option to include the created video in the error report; and
    the method further comprises sending the error report with the created video to the third party upon receiving the user selection of the option to include the created video in the error report.

3. The method of claim 1, wherein recording screenshots associated with a user session comprises recording only the active window of the user session.

4. The method of claim 1, wherein recording screenshots associated with a user session comprises recording only when the session is not idle.

5. The method of claim 1, wherein recording screenshots associated with a user session comprises recording a desktop of the user session.

6. The method of claim 1, wherein recording screenshots associated with a user session comprises:
    saving recorded screenshots to a buffer; and
    discarding screenshots that are older than a specified time from the buffer.

7. A non-transitory computer readable storage medium including instructions that, when executed by a client computer system, cause the client computer system to perform a method comprising:
    recording, by a processing device of the client computer system, screenshots associated with a user session;
    removing, by the client computer system, sensitive data from the recorded screenshots;

in response to an error in a user application that has occurred during the user session, terminating the recording;

creating, by the client computer system, a video from the recorded screen shots with removed sensitive data, and storing the created video in a local store;

presenting, on a screen of the client computer system, a user interface (UI) comprising information about the error, the UI further comprising a UI control element facilitating a user selection of an option to play back the created video, and a UI element facilitating a user confirmation that the information about the error does not include the sensitive data;

in response to a selection of the option to play back the created video by the user via the UI control element, playing back, by the client computer system, the created video from the local store; and upon receiving the user confirmation that the information about the error does not include sensitive data, generating an error report comprising the information about the error, and sending the error report and the created video to a third party for analysis.

8. The non-transitory computer readable storage medium of claim 7, wherein:

the UI further comprises a UI element facilitating a user selection of an option to include the created video in the error report; and the method further comprises:

sending the error report with the created video to the third party upon receiving the user selection of the option to include the created video in the error report.

9. The non-transitory computer readable storage medium of claim 7, wherein recording screenshots associated with a user session comprises recording only the active window of the user session.

10. The non-transitory computer readable storage medium of claim 7, wherein recording screenshots associated with a user session comprises recording only when the session is not idle.

11. The non-transitory computer readable storage medium of claim 7, wherein recording screenshots associated with a user session comprises recording a desktop of the user session.

12. The non-transitory computer readable storage medium of claim 7, wherein recording screenshots associated with a user session comprises:

saving recorded screenshots to a buffer; and discarding screenshots that are older than a specified time from the buffer.

13. A client computer system comprising:

a memory; and a processor, coupled to the memory, to:

record screenshots associated with a user session;

remove sensitive data from the recorded screenshots;

in response to an error in a user application that has occurred during the user session, terminate the recording;

create a video from the recorded screen shots with removed sensitive data, and store the created video in a local store;

present, on a screen of the client computer system, a user interface (UI) comprising information about the error, the UI further comprising a UI control element facilitating a user selection of an option to play back the created video, and a UI element facilitating a user confirmation that the information about the error does not include sensitive data;

in response to a selection of the option to play back the created video by the user via the UI control element, play back, by the client computer system, the created video from the local store; and upon receiving the user confirmation that the information about the error does not include sensitive data, generate an error report comprising the information about the error, and sending the error report and the created video to a third party for analysis.

14. The system of claim 13, wherein the processor is to record the screenshots associated with the user session by recording only the active window of the user session.

15. The system of claim 13, wherein the processor is to record the screenshots associated with the user session by recording only when the session is not idle.

16. The system of claim 13, wherein the processor is to record the screenshots associated with the user session by:

saving recorded screenshots to a buffer; and discarding screenshots that are older than a specified time from the buffer.

* * * * *